United States Patent [19]

Ban et al.

[11] Patent Number: 4,850,709
[45] Date of Patent: Jul. 25, 1989

[54] FABRI-PEROT SPECTROSCOPY METHOD AND APPARATUS UTILIZING THE SAME

[75] Inventors: Mikichi Ban, Yokohama; Osamu Kakuchi, Kawasaki; Hironori Yamamoto, Chigasaki; Masaru Ohtsuka, Yokohama; Osamu Shiba, Yokohama; Kazuhiko Hara, Yokohama, all of Japan

[73] Assignee: Canon Kabushiki Kaisha, Tokyo, Japan

[21] Appl. No.: 19,665

[22] Filed: Feb. 27, 1987

[30] Foreign Application Priority Data

Mar. 4, 1986 [JP] Japan .................. 61-45295
Mar. 4, 1986 [JP] Japan .................. 61-45296
Jun. 18, 1986 [JP] Japan .................. 61-140292
Oct. 17, 1986 [JP] Japan .................. 61-247193

[51] Int. Cl.[4] .............................................. G01B 9/02
[52] U.S. Cl. ..................................................... 356/352
[58] Field of Search ............................... 356/346, 352

[56] References Cited

U.S. PATENT DOCUMENTS 3,967,211  6/1976  Itzkan et al. .................. 331/94.5 S
4,076,422  2/1978  Kohno .......................... 356/106 S
4,525,067  6/1985  Hernandez .................... 356/346

FOREIGN PATENT DOCUMENTS 2501422  7/1975  Fed. Rep. of Germany .
2145237  3/1985  United Kingdom .

OTHER PUBLICATIONS

Rees, et al., "A Stable Rugged, Capacitance-Stabilized Piezoelectric Scanned Fabry-Perot Etalon", *J. Phys. E.: Sci. Instru.*, vol. 14, No. 11, pp. 320-325, 11/81.

L. N. Durvasula et al., Pressure Scanned Three-Pass Fabry-Perot Interferometer, Applied Optics, vol. 17, No. 20, Oct. 15, 1978, pp. 3298-3303.

D. Rees et al., Stable and Rugged Etalona for the Dynamics Explorer Fabry-Perot Interferometer . . . , Applied Optics, vol. 21, No. 21, Nov. 1, 1982, pp. 3896-3912.

J. G. Winter, Servocontrol of a Fabry-Perot Interferometer, J. Phys. E.: Sci. Instrum, vol. 18, 1985, pp. 505-509.

*Primary Examiner*—Davis L. Willis
*Assistant Examiner*—Matthew W. Koren
*Attorney, Agent, or Firm*—Fitzpatrick, Cella, Harper & Scinto

[57] ABSTRACT

Fabri-Pérot spectroscopy method comprises a step of directing a light beam at a first refraction angle to a first Fabri-Pérot interference plate and a step of directing a light beam transmitted through the first Fabri-Pérot interference plate to a second Fabri-Pérot interference plate at a second refraction angle, and Fabri-Pérot spectroscopy apparatus comprises Fabri-Pérot interference plates, a control device for changing a spacing between the Fabri-Pérot interference plates, a first optical device for directing a light beam to the first Fabri-Pérot interference plate at a first refraction angle, a second optical device for directing the light beam transmitted through the Fabri-Pérot interference plate at a second refraction angle different from the first refraction angle to the second Fabri-Pérot interference plate, and a seal for externally sealing the Fabri-Pérot interference plates. Gas for protecting the Fabri-Pérot interference plates is filled in the sealed space.

9 Claims, 5 Drawing Sheets

FABRI-PEROT SPECTROSCOPY METHOD AND APPARATUS UTILIZING THE SAME

BACKGROUND OF THE INVENTION

1. Field of the Invention

The present invention relates to Fabri-Pérot spectroscopy method and Fabri-Pérot spectroscopy apparatus utilizing the same, and more particularly to Fabri-Pérot spectroscopy method and apparatus having a high spectroscopy resolution by passing a light beam containing multi-wavelength through a Fabri-Pérot interference plate a plurality of times to expand an interval between adjacent wavelengths of the light to be spectroscopied.

2. Related Background Art

Of various spectroscopy methods, a Fabri-Pérot spectroscopy method has been well known as a spectroscopy method having a high wavelength resolution.

FIG. 1 shows a basic principle of the Fabri-Pérot spectroscopy method.

Numerals 1 and 3 denote high reflection films, numerals 2 and 4 denote glass plates, numeral 5 denotes an incident light and numeral 6 denotes a transmitted light. In the Fabri-Pérot spectroscopy method, the glass plate 2 having the high reflection film 1 formed thereon and the glass plate 4 having the high resolution film 3 formed thereon are arranged in parallel with a spacing h therebetween to form a Fabri-Pérot interference plate.

A spectroscopy transmitted light 6 produced when the incident light 5 having various wavelengths is applied to the Fabri-Pérot interference plate at a predetermined incident angle is given by the following formula. A transmission factor T which is a ratio of a transmitted light intensity $I^{(t)}$ to an incident light intensity $I^{(i)}$ of a wavelength $\lambda_0$ is $$T = \frac{I^{(t)}}{I^{(i)}} = \frac{1}{1 + F \sin^2 \frac{\delta}{2}} \quad (1)$$

$$\delta = \frac{2\pi \cdot 2 \cdot n' \cdot h \cdot \cos\theta'}{\lambda_0} \quad (2)$$

$$F = \frac{4R}{(1-R)^2} \quad (3)$$

where n' is a refraction coefficient of a medium, $\theta'$ is a refraction angle in the medium n', and R is a reflection coefficient of the high reflection films 1 and 2. (See "Principles of Optics" 3rd Edition, M. Born and E. Wolf, Pergamon Press, 1965, page 327.)

When the spacing h and the refraction angle $\theta'$ are constant, the transmission factor T to wavelengths $\lambda_{N-1}$, $\lambda_N$ and $\lambda_{N+1}$ are shown in FIG. 2. As seen from the formula (1), T is a periodic function of $\delta$. In the formula (2), when $\delta = 2\pi N$ (where N is an integer), T is maximum and the light having the wavelength $\lambda_0 = \lambda_N$ is transmitted.

When $n' = 1$, the formula (2) is rewritten as $$2\pi N = 2\pi \cdot \frac{2 \cdot h \cos\theta'}{\lambda_N} \quad (4)$$

and the transmitted light $\lambda_N$ is given by $$\lambda_N = \frac{2 \cdot h \cos\theta'}{N} \quad (5)$$

When h=10 mm and $\theta'=0$, $\lambda_N$ is given by Table 1.

TABLE 1

| N(integer) | $\lambda_N(\mu m)$ |
| --- | --- |
| 39,998 | 0.5000250 |
| 39,999 | 0.5000125 |
| 40,000 | 0.5000000 |
| 40,001 | 0.4999875 |
| 40,002 | 0.4999750 |

When $h = 1.6 \times 10^{-3}$ mm and $\theta'=0°$, $\lambda_N$ is given by Table 2.

TABLE 2

| N | $\lambda_N(\mu m)$ |
| --- | --- |
| 4 | 0.80000 |
| 5 | 0.64000 |
| 6 | 0.53333 |
| 7 | 0.45714 |
| 8 | 0.40000 |

It is seen that the interval between adjacent wavelengths significantly varies with the spacing h. For example, the interval between wavelengths is 0.0000125 $\mu m$ (=0.0125 nm) in the Table 1, and it is 0.07619 $\mu m$ (difference between wavelengths for N=6 and N=7) in the Table 2.

A wavelength resolution is given by a finess F which is a ration of the difference between adjacent wavelengths and a half-amplitude width $\Delta\lambda_N$. That is, the finess F is given by $$F = \frac{\lambda_{N+1} - \lambda_N}{\Delta\lambda_N} = \frac{\pi\sqrt{F'}}{2} \quad (6)$$

The finess F is determined by F' of the formula (3), and F is determined by a reflection coefficient R. Thus, the finess F is determined by the reflection coefficient R. For example, when R=0.95,

F=61.2 and when the spacing h=10 mm, the wavelength resolution is 0.0125 $\mu m/61.2=0.0002$ nm, and when the spacing $h=1.6\times10^{-3}$ mm, it is 0.07619 ($\mu m$)/61.2=0.0012 $\mu m$ = 1.2 nm. In any case, the resolution is very high. On the other hand, the interval between the adjacent wavelengths is small and the wavelength band of the spectroscopy apparatus is narrow.

In FIG. 3, in order to resolve the above problem, the apparatus is combined with another spectrometer (prism spectrometer) to measure a specific wavelength with a high resolution. (See "Principles of Optics", 3rd Edition, M. Born and E. Wolf, Pergamon Press, 1965, page 336.)

In FIG. 3, numeral 7 denotes a light source, numeral 8 denotes a collimeter lens, numeral 9 denotes a Fabri-Pérot interference plate, numeral 10 denotes a focusing lens, numeral 11 denotes a pinhole, numeral 12 denotes a collimeter lens, numeral 13 denotes a prism, numeral 14 denotes a focusing lens, and numeral 15 denotes a view plane.

A light emitted from the light source is collimated by the collimeter lens 8, spectroscopied by the Fabri-Pérot interference plate 9 and focused on the pinhole 11 by the focusing lens 10. The lights other than that on an optical axis is blocked by the pinhole 11 and the remaining light is recollimated by the collimeter lens 12, passes through the prism 13 where outlet angle is changed with the wavelength, and the light is focused by the focusing lens 14 on the view plane 15 on which focusing points for individual wavelengths are positionally separated. In this manner, the adjacent wavelengths are separated.

However, in this method, it is necessary to use the other spectroscopy method, that is, the prism spectroscopy method, and troublesome optical axis alignment and correction of aberration are required to match the spectrometers.

Accordingly, a practical Fabri-Pérot spectroscopy method is limited to measurement of a longitudinal mode of a laser beam having a narrow spectrometric band.

SUMMARY OF THE INVENTION

It is an object of the present invention to provide Fabri-Pérot spectroscopy method and apparatus which have a wide spectroscopy wavelength band and a wide interval between adjacent wavelengths without requiring the use of another spectroscopy method.

In order to achieve the above object, the present method comprises a step of directing a light beam at a first refraction angle to a first Fabri-Pérot interference plate and a step of directing a light beam transmitted through the first Fabri-Pérot interference plate to a second Fabri-Pérot interference plate at a second refraction angle.

In accordance with the present method, by properly selecting a spacing h between the first and second Fabri-Pérot interference plate and a first refraction angle $\theta'_1$ and a second refraction angle $\theta'_2$ as wavelength selection parameters, interference occurs and a wavelength of the transmitted light which is enhanced is specified. Accordingly, only the specified wavelength is spectroscopied and the usable wavelength band is expanded.

When the first Fabri-Pérot interference plate and the second Fabri-Pérot interference plate are the same, the above function can be attained with a compact construction.

In accordance with one aspect of the present invention, the Fabri-Pérot spectroscopy apparatus comprises Fabri-Pérot interference plates, control means for changing a spacing between the Fabri-Pérot interference plates, first optical means for directing a light beam to the Fabri-Pérot interference plate at a first refraction angle, and a second optical means for directing the light beam transmitted through the Fabri-Pérot interference plate to the Fabri-Pérot interference plate at a second refraction angle different from the first refraction angle.

In accordance with another aspect of the present invention, the Fabri-Pérot spectroscopy apparatus has two transparent plates each having a reflection film which transmits a certain amount of light formed thereon, arranged such that the reflection films face each other. In at least one of the two transparent plates, a plane opposite to the reflection film is not parallel to the reflection film and has a partial reflection film formed thereon.

In accordance with another aspect of the present invention, the Fabri-Pérot spectroscopy apparatus comprises Fabri-Pérot interference plates, control means for changing a spacing between the Fabri-Pérot interference plates, first optical means for directing a light beam to the Fabri-Pérot plate at a first refraction angle, second optical means for directing the light beam transmitted through the Fabri-Pérot interference plate to the Fabri-Pérot interference plate at a second refraction angle different from the first refraction angle, and seal means for externally sealing the Fabri-Pérot interference plates, gas for protecting the Fabri-Pérot interference plates being filled in the sealed space.

Other features of the present invention will be apparent from the following description of the preferred embodiments.

DETAILED DESCRIPTION OF THE PREFERRED EMBODIMENTS

Figure 1:
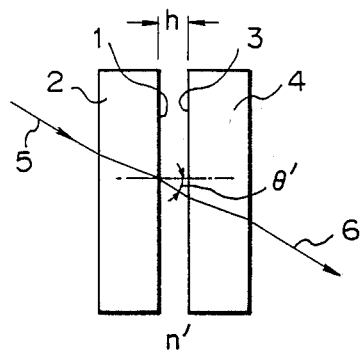
FIG. 1 shows a basic principle of a Fabri-Pérot spectroscopy method.
Figure 2:
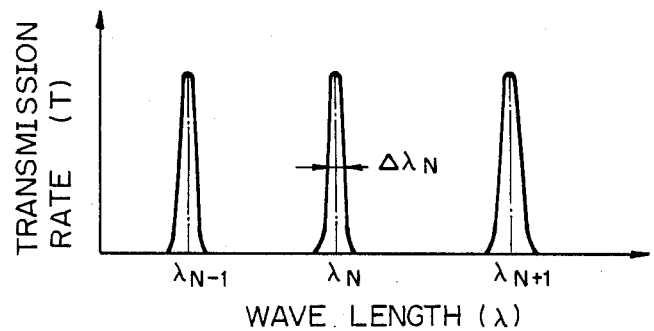
FIG. 2 shows a spectroscopy transmission rate of a Fabri-Pérot spectroscopy apparatus.
Figure 3:
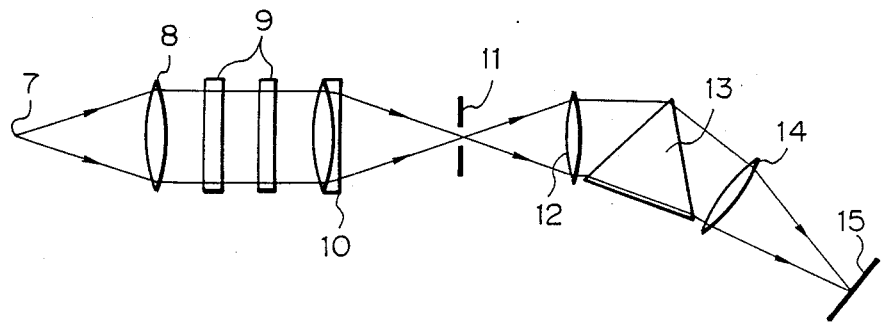
FIG. 3 shows a prior art Fabri-Pérot spectroscopy apparatus.
Figure 4:
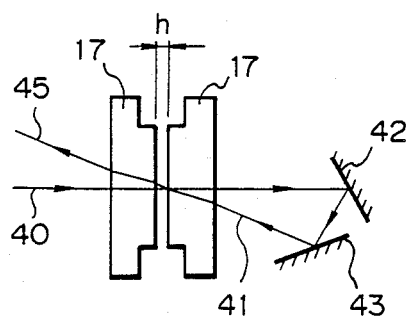
FIG. 4 shows a principle of spectroscopy in the Fabri-Pérot spectroscopy method of the present invention.

FIG. 4 shows a principle of the present invention. Numeral 17 denotes a Fabri-Pérot interference plate, numeral 40 denotes a first incident light, numeral 41 denotes a second incident light, numerals 42 and 43 denote reflection mirrors, and numeral 45 denotes a spectroscopied transmitted light.

In the Fabri-Pérot spectroscopy method of the present invention, a light is directed at least two times to the same or different Fabri-Pérot interference plates 17 to transmit only a predetermined wavelength. Namely, the first incident light 40 is directed to the Fabri-Pérot interference plates 17 having a spacing h at a first refraction angle $\theta'_1$, and the transmitted light (second incident light 41) is again directed to the Fabri-Pérot interference plates 17 by the reflection mirrors 42 and 43 at a second refraction angle $\theta'_2$. As a result, adjacent wavelengths are eliminated and the light 45 of a specific wavelength is obtained.

For example, when the spacing h=1.6 μm and the first refraction angle $\theta'=0°$, five wavelengths in the wavelength range of 0.4∫0.8 μm are transmitted, as seen from Table 1. If the second incident light 41 is applied at the second refraction angle $\theta'_2=36.87°$, the wavelengths in Table 3 in the wavelength range of 0.4~0.8 μm are transmitted.

TABLE 3

| N | $\lambda_N(\mu m)$ |
|---|---|
| (3) | (0.8533) |
| 4 | 0.6400 |
| 5 | 0.5120 |
| 6 | 0.4267 |
| (7) | (0.3657) |

From the comparison with Table 2, it is apparent that only the wavelength of 0.64 μm which corresponds to N=4 matches with $\lambda_N$ of table 1. Accordingly, only the specific wavelength 0.64 μm in the wavelength range of 0.4∼0.8 μm is spectroscopied and the usable wavelength range is expanded.

Figure 6:
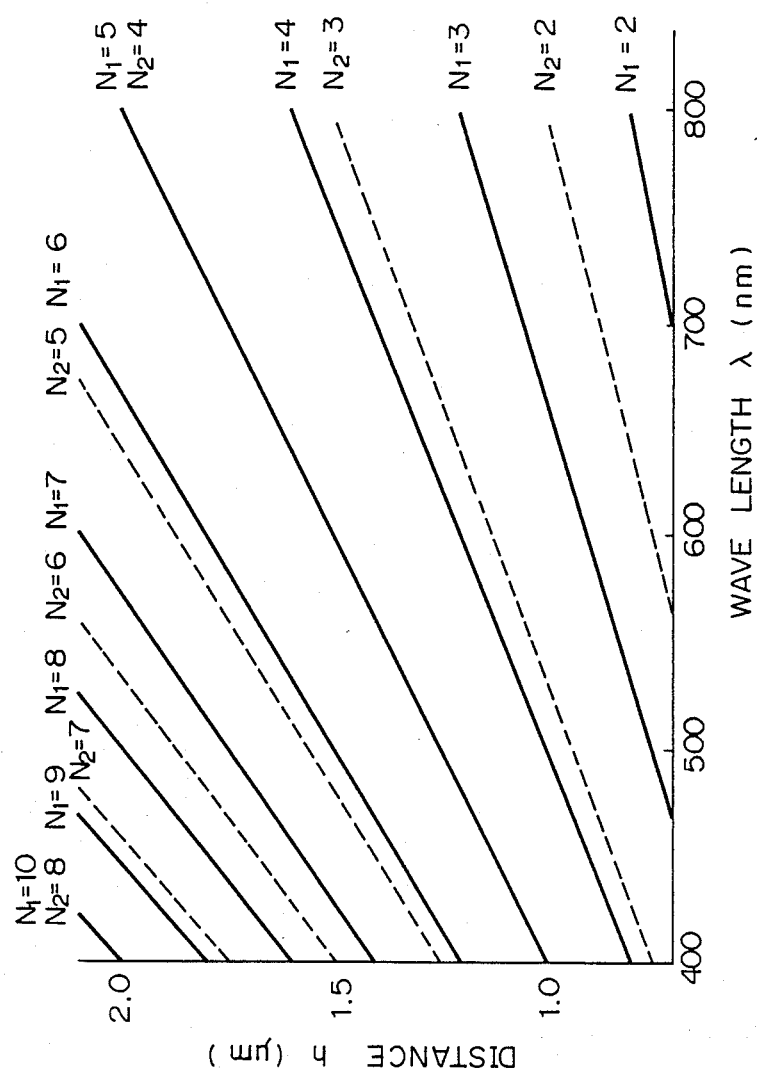
FIG. 6 shows a graph of a transmitted wavelength λ (abscissa) versus a spacing h of interference plates (ordinate) with an order $N_1$ (solid line) when a refraction angle $\theta'_1=0$ and an order $N_2$ (broken line) when the refraction angle $\theta'_1=36.87°$ being parameters in the present spectroscopy method.

FIG. 6 shows a graph of the transmitted wavelength λ (abscissa) versus the spacing h of the interference plates 17 (ordinate) with an order $N_1$ (solid line) when the refraction angle $\theta'_1=0°$ and an order $N_2$ (broken line) when the refraction angle $\theta'_1=36.8720$ being parameters. The broken line and the solid line matches only when $N_1=5$ and $N_2=4$, when the spacing h is between 1.0∼2.0 μm and the wavelength is between 0.4∼0.8 μm.

Accordingly, if the spacing h is finely and continuously changed between 1.0∼2.0 μm by a piezoelectric element, the lights from 0.4 μm to 0.8 μm can be continuously spectroscopied.

Figure 5:
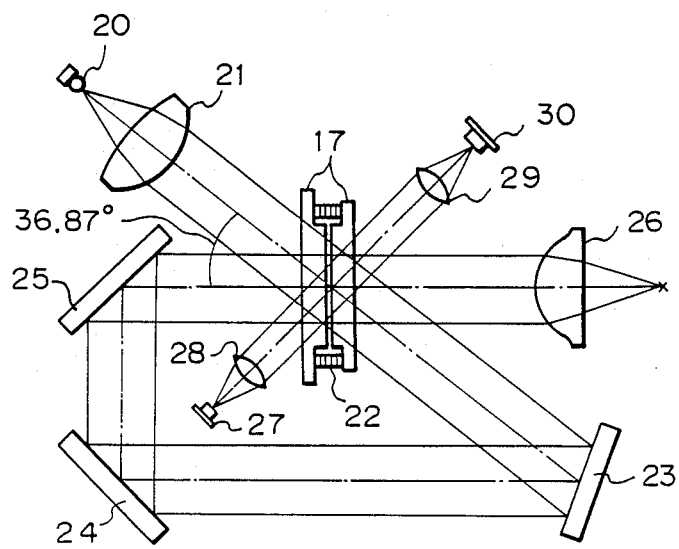
FIG. 5 shows one embodiment of the Fabri-Pérot spectroscopy apparatus of the present invention.

FIG. 5 shows an embodiment of the Fabri-Pérot spectroscopy apparatus which uses the spectroscopy method of the present invention.

Numeral 20 denotes a light source for emitting a light to be spectroscopied, numeral 21 denotes a collimeter lens, numeral 22 denotes fine drive means such as a piezoelectric element, numeral 17 denotes a Fabri-Pérot interference plate, numerals 23, 24 and 25 denote reflection mirrors, numeral 26 denotes a condenser lens, numeral 27 denotes a light source such as a light emitting diode, numeral 28 denotes a collimeter lens, numeral 29 denotes a condenser lens, and numeral 30 denotes a photo-electric transducer.

The light emitted from the light source 20 is collimated by the collimator lens 21 and directed to the Fabri-Pérot interference plates 17 at a predetermined refraction angle $\theta'_1$, for example, 36.87°. The Fabri-Pérot interference plates 17 comprise two plates having translucent mirrors of a high reflection coefficient arranged in parallel to face each other with a predetermined spacing being held therebetween by a piezoelectric element. The spacing between the opposing planes is variable between 1.0 μm and 2.0 μm. The light beam transmitted through the Fabri-Pérot interference plates 17 is deflected a plurality of times by the reflection mirrors 23, 24 and 25, and again directed to the Fabri-Pérot interference plates 17 at a predetermined refraction angle $\theta'_2$, for example 0°, as shown in FIG. 5. The spectroscopied transmitted light is condensed by the condenser lens 26 so that the light from the light source 20 is spectroscopied.

What is important here is the control and maintenance of the spacing between the Fabri-Pérot interference plates 17. For the purpose of control and maintenance, the light source 27 having a wavelength which is transmitted when the spacing between the Fabri-Pérot interference plates 17 has a certain value and the light is directed at a predetermined refraction angle, the optical systems 28 and 29 for directing the light to the detection system 30 for detecting the reference spacing. The light emitted from the light source, for example, light emitting diode 27 is collimated by the collimator lens 28, directed to the Fabri-Pérot interference plates 17 at the predetermined refraction angle and the transmitted light is focused on the photo-electric transducer 30 by the condenser lens 29. Thus, the spacing between the Fabri-Pérot interference plates 17 is controlled in accordance with an output of the photo-electric transducer 30.

For example, when a center wavelength of the light emitting diode 27 is 0.65 μm and the refraction angle is 45°, the light is transmitted when the spacing is 2.298 μm (order N=5), 1.83 μm (order N=4), 1.379 μm (order N=3) and 0.919 μm (order N=2). Accordingly, by controlling and maintaining the spacing h to one of those values, the light of the desired wavelength can be precisely spectroscopied from the light emitted from the light source 20.

In accordance with the present invention, the light is directed to the Fabri-Pérot interference plates 17 at least two times, accordingly, the wavelength resolution is significantly improved over the prior art method, because through the two-time light direction, the half-amplitude width $\Delta\lambda_N$ is reduced and the resolution which is determined by the difference between adjacent wavelengths and the half-amplitude width $\Delta\lambda_N$ is made better.

The present method is not limited to the above embodiment but various modifications may be made.

In the above embodiment, the light is directed twice to the Fabri-Pérot interference plates at different refraction angles, although it may be directed more than two times. For example, as compared with the case which the light beam is directed twice to the Fabri-Pérot interference plate so as to have said first transmitted light beam (order 5) and said second transmitted light beam (order 4), since said second transmitted light beam is directed to the different Fabri-Pérot interference plate at the angle of 51.13° in another case (the third transmitted light beam is accurred (order 3)), the condition of coincidence is severer. So it is better to protect from mixing other wavelengths into the finally transmitted light beam.

Where the first Fabri-Pérot interference plates and the second Fabri-Pérot interference plates are separately arranged, the first refraction angle and the second refraction angle need not necessarily be different. If the spacing of at least one of the first Fabri-Pérot interference plates and the second Fabri-Pérot interference plates is variable, the same effect as that for the different refraction angles is attained by varying the spacing.

Thus, by passing the light beam to be spectroscopied through the Fabri-Pérot interference plates at least two times, the adjacent wavelengths are cut off and the spectroscopy wavelength range can be widened. By passing the light a plurality of times, the interval between the spectroscopied wavelength and the adjacent wavelength is expanded and the wavelength resolution is enhanced.

Figure 7:
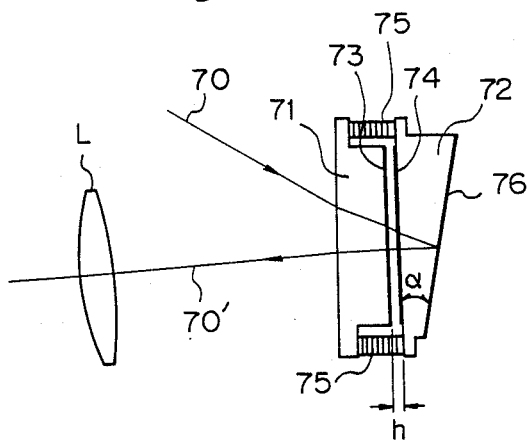
FIGS. 7, 8 and 9 show other embodiments of the Fabri-Pérot spectroscopy apparatus of the present invention.

FIG. 7 shows another embodiment of the Fabri-Pérot spectroscopy apparatus of the present invention. It shows Fabri-Pérot interference plates and a condenser lens for condensing the spectroscopied transmitted light. Numerals 71 and 72 denote absorption-free transparent plates, numerals 73 and 74 denote reflection films which have a high reflection coefficient and partially transmit a light, numeral 75 denotes a piezoelectric element which holds the transparent plates 71 and 72 in parallel at a predetermined spacing therebetween, and L denotes a condenser lens.

An appropriate voltage is applied to the piezoelectric element 75 to control the spacing between the reflection films 73 and 74 on the transparent plates 71 and 72. By controlling the spacing h between the reflection, a predetermined wavelength resolution is attained.

In the Fabri-Pérot interference plates of the present embodiment, in order to direct a light beam 70 to the reflection films 73 and 74 at least two times at different refraction angles, a plane 76 opposite to the reflection film 74 on the transparent plate 72 is angled so that it is not parallel to the reflection film 74 and a reflection film is formed on the plane 76 to form a reflection plane. Thus, the light 70' transmitted through the Fabri-Pérot interference plates includes only a predetermined wavelength, and it is condensed by the condenser lens L. Namely, the light beam 70 is directed to the Fabri-Pérot interference plates having the reflection films 73 and 74 spaced by h, at a refraction angle $\theta'_1$, and the transmitted light is reflected by the plane 76 and directed to the Fabri-Pérot interference plates at a refraction angle $\theta'_2$ so that the adjacent wavelengths are eliminated and the transmitted light 70' having only the predetermined wavelength is taken out.

The angle setting between the reflection film 74 and the plane 76 is explained.

A refraction coefficient of a medium between the reflection films 73 and 74 is given by n', a refraction coefficient of the transparent plate 72 is given by n, a first refraction angle of the light beam 70 in the medium between the reflection films 73 and 74 is given by $\theta'_1$, a second refraction angle of the light beam 70 in the medium between the reflection films 73 and 74 is given by $\theta'_2$, refraction angles in the transparent plate 72, of the refraction angles $\theta'_1$ and $\theta'_2$ are given by $\theta_1$ and $\theta_2$, respectively, the spacing between the reflection films 73 and 74 is given by h, an angle between the reflection plane 74 and the plane 76 is given by $\alpha$, a wavelength of the transmitted light of the light beam 70 is given by $\lambda$, an order of the Fabri-Pérot interference at the refraction angle $\theta'$hd 1 is given by M, and an order of the Fabri-Pérot interference at the refraction angle $\theta'_2$ is given by N. Then, $$\lambda = \frac{2h \cdot \cos \theta'_1}{M} = \frac{2h \cdot \cos \theta'_2}{N} \quad (7)$$

$$n' \cdot \sin \theta'_1 = n \cdot \sin \theta_1 \quad (8)$$

$$n' \cdot \sin \theta'_2 = n \cdot \sin \theta_2 \quad (9)$$

$$\alpha = \frac{\theta_1 - \theta_2}{2} \quad (10)$$

The formula (7) is rewritten as follows.

$$\theta'_2 = \cos^{-1}\left[\frac{N}{M} \cdot \cos \theta'_1\right] \quad (11)$$

When $\theta'_1 = 36.94°$, M=4, N=5, $n^1=1$ and n=1.46, the angle $\alpha$ is given as follows.

$$\theta'_2 = 2.46°$$

$$\theta_2 = \sin^{-1}\left[\frac{1}{1.46} \cdot \sin \theta'_2\right] = 1.68°$$

-continued $$\theta_1 = \sin^{-1}\left[\frac{1}{1.46} \cdot \sin \theta'_1\right] = 24.31°$$

$$\alpha = \frac{\theta_1 - \theta_2}{2} = \frac{24.31 - 1.68}{2} = 11.32°$$

By setting the $\alpha$ between the reflection film 74 and the plane 76 in this manner, the light beam having only the predetermined wavelength can be taken out with a high wavelength resolution. By directing the light beam to the Fabri-Pérot interference plates having the spacing h a plurality of times (two times in the present embodiment, although it may be more than two times), the interference is enhanced so that only the specific wavelength is efficiently spectroscopied with the high wavelength resolution.

Figure 8:
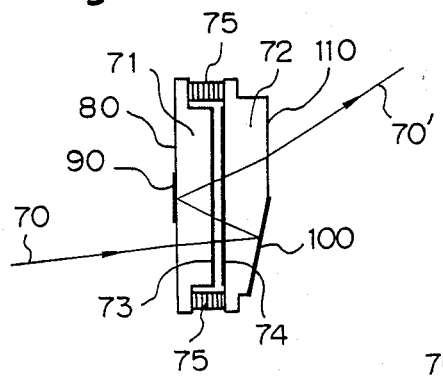
Figure 9:
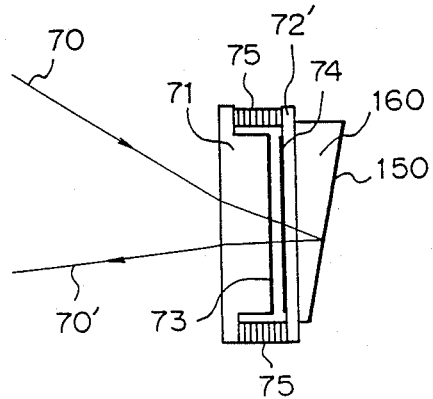

FIGS. 8 and 9 show other embodiments of the Fabri-Pérot spectroscopy apparatus of the present invention. The like elements to those shown in FIG. 7 are designated by the like numerals.

In the embodiment shown in FIG. 8, a reflection film is formed on a portion of a plane 80 opposite to the reflection film 73 of the transparent plate 71 to form a reflection plane 90. A portion 100 of a plane opposite to the reflection film 74 of the transparent plate 72 is inclined and a reflection film is formed thereon to form a reflection plane. The other portion 110 functions as a transmission plane.

In the present embodiment, the light beam 70 is directed to the reflection films 73 and 74 and reflected by the reflection plane 100. Then, it is again directed to the reflection films 73 and 74. It is reflected by the reflection plane 90 and again directed to the reflection films 73 and 74, and then emitted through the transmission plane 110.

Thus, in the present embodiment, the light beam is transmitted through the reflection films 73 and 74 three times to effectively spectroscope the light beam.

In the present embodiment in which the light beam is transmitted through the reflection films 73 and 74 three times, the half-amplitude width of the spectroscopied light beam can be reduced if the two refraction angles of the light beam are same at least. If the reflection plane 90 is inclined to the reflection plane 73, the refraction angles in the medium between the reflection films 73 and 74 are increased by one and the usable wavelength range can be further expanded.

In the embodiment shown in FIG. 9, the transparent plate 72 in FIG. 7 comprises two members. Namely, it comprises a transparent plate 72' having parallel planes coated with a reflection film 74 on one plane thereof, and a wedge-shaped optical member 160 having a reflection plane 150, and bonded to the transparent plate 72'.

In the present embodiment in which the portion of the Fabri-Pérot interference plates is made of two members, various refraction angles can be obtained by merely changing the wedge-shaped optical member 160.

In the embodiments shown in FIGS. 7 to 9, the Fabri-Pérot interference plates having the two transparent plates are utilized. Thus, the Fabri-Pérot spectroscopy apparatus is stable against external temperature and vibration, is compact because of fewer components, is easy to adjust in assembling and is of high precision.

In order to obtain desired wavelengths (0.4~0.8 μm) over a wide band, a reflection film (e.g. Ag) which has a low absorption and a high reflection coefficient in such a wide range is requisite. However, such a film, when exposed to air, chemically reacts to change the reflection coefficient. As a result, the stability is low.

In the following two embodiments, Fabri-Pérot spectroscopy apparatus which protects the reflection film having a high reflection coefficient over a wide range to provide a stable output light is provided.

In the following embodiments, seal means for sealing the Fabri-Pérot interference plates is provided to seal specific gas in a space sealed by the seal means. With this arrangement;

1 the deterioration of the high reflection film is prevented by using inert gas to the high reflection film as the interference plate protection gas, and 2 the stability of measurement is maintained because the seal means prevents external heat and dusts from entering.

A Fabri-Pérot spectroscopy apparatus in which the spectroscopied wavelength is changed by changing a pressure of gas filled in the sealed spaced between the Fabri-Pérot interference plates (pressure sweep type), instead of changing the spacing between the Fabri-Pérot interference plates, has been known, but it is essentially different from the following embodiment in that;

1 the gas in the pressure sweep type is used to change the spectroscopied wavelength due to the change of the refraction coefficient while the gas in the embodiment is used to protect the high reflection film, and 2 the gas in the pressure sweep type needs pressure regulation means while the present embodiment does not necessarily need it.

Figure 10:
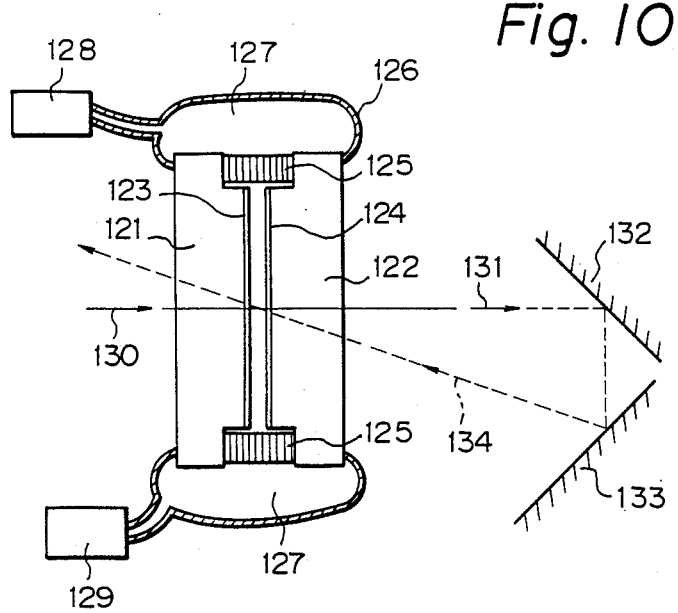
FIGS. 10, 11A and 11B show further embodiments of the Fabri-Pérot spectroscopy apparatus of the present invention.

FIG. 10 shows other embodiment of the Fabri-Pérot spectroscopy apparatus of the present invention.

Numerals 121 and 122 denote a pair of parallel plates, numerals 123 and 124 denote high reflection films vapor-deposited on the plates 121 and 122, respectively, numeral 125 denote drive means such as a piezoelectric element from controlling a spacing between the high reflection films 123 and 124 of the plates 121 and 122, numeral 126 denotes a seal mechanism, numeral 127 denote inert gas, numeral 128 denotes a gas supply and numeral 129 denotes a gas exhaust. Numeral 130 denotes an incident light, numeral 131 denotes an output light, numerals 132 and 133 denote reflection mirrors and numeral 134 denotes a reentered incident light.

In the present embodiment, the light to be spectroscopied is transmitted through the Fabri-Pérot interference plates at least two times at different angles to that only a selected wavelength is separated. Various wavelengths may be selected by changing the spacing between the plates by the piezoelectric element 125. In order to produce the desired wavelengths over a wide range (for example, 400~800 nm), a reflection film (for example, Ag) which has low absorption and high reflection coefficient in such a wide range is required. However, when such a film is used, it chemically reacts in air to reduce the reflection coefficient and spectroscopy ability.

In the present embodiment, the seal mechanism 126 which externally seals at least the high reflection films is provided, and gas (for example, $N_2$ inert gas) which prevents deterioration of the high reflection films is filled in the sealed space to prevent the deterioration of the films in air. If a volume of the sealed space is selected relative to the change of volume due to the spacing between the plates such that the change of pressure is negligible, the change of light path length caused by the change of refraction coefficient due to the change of volume is totally negligible.

For example, in order to obtain output wavelengths in a range of 400~800 nm, it is necessary to change the spacing between the planes by 1~2 μm. When the plates of 30 mm are used, the change of volume of gas filled between the plates is in the order of $10^{-1}$ mm$^3$, which is very small to compare with the volume to be sealed between the plates. Accordingly, the change of pressure is negligible.

When the seal mechanism 126 has a heat insulation effect, the change of pressure of the gas between the plates due to an external heat and the change of light path length due to the change of refraction coefficient can also be prevented.

The seal mechanism 126 can also prevent external fine dusts from entering.

Figures 11A, 11B:
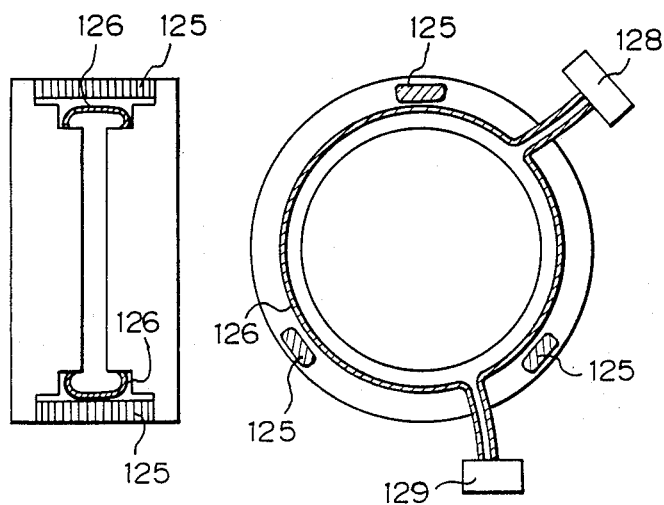

FIGS. 11(A) and 11(B) show side view and front view (viewed along an incident light 130) of a further embodiment of the present invention. The like elements to those shown in FIG. 10 are designated by the like numerals. Numeral 126 denotes a seal mechanism having a heat insulation effect.

In the present embodiment, the seal mechanism 126 is arranged between the piezoelectric elements 125 and the plates. Accordingly, not only the external heat but also the heat generated by the piezoelectric elements are insulated. It is effective when the heat generated by the piezoelectric elements 125 is large and the affect thereby to the pressure of the gas between the plates and to the refraction coefficient is large.

The inert gas not only prevents the deterioration of the reflection films but also can change the light path length by changing the pressure of high precision gas pressure regulation means (high precision gas supply and gas exhaust.) A selected wavelength may be spectroscopied by a combination of the drive distance by the piezoelectric element and the gas pressure.

As explained above, since the seal means for sealing at least the high reflection films is provided and the gas (e.g. $N_2$) effective to protect the films such as inert gas is filled in the sealed space, the deterioration of the high reflection films by the chemical reaction in air is prevented and stable spectroscopy is attained.

What we claim is:

1. A Fabri-Pérot spectroscopy method comprising the steps of:
   causing a light beam to enter between two transparent plates at a first refraction angle for spectroscopically analyzing the light beam;
   causing the analyzed light beam in said first step again to enter between said two transparent plates at a second refraction angle for further spectroscopically analyzing the light beam; and
   causing the analyzed light beam in said second step still again to enter between said two transparent plates at a third refraction angle for still further spectroscopically analyzing the light beam, wherein one of the first, second and third refraction angles is different than another refraction angle.

2. A method according to claim 1 wherein two of the first, second and third refracting angles are equal.

3. A Fabri-Pérot spectroscopy apparatus comprising:

a first transparent plate having a first surface and a third surface opposite to the first surface, said third surface including a reflection surface portion and a transmission surface portion; and a second transparent plate having a second surface positioned to be opposed to said first surface of said first transparent plate and a fourth surface opposite to said second surface, said fourth surface including a reflection surface portion and a transmission surface portion, said first and second transparent plates spectroscopically analyzing a light beam caused to enter between said first and second surfaces;

whereby a light beam incident on the transmission surface portion of said third surface is caused to enter between said first and second surfaces, be reflected by the reflection surface portion of said fourth surface, again enter between said first and second surfaces, be reflected by the reflection surface portion of said third surface, still again enter between said first and second surfaces and be emitted through the transmission surface portion of said fourth surface.

4. An apparatus according to claim 3 further comprising means for varying the distance between said first and second surfaces.

5. An apparatus according to claim 3 wherein the reflection surface portions of said third and fourth surfaces are set to form a predetermined angle therebetween.

6. A Fabri-Pérot spectroscopy apparatus comprising:

two transparent plates having two opposed surfaces for spectroscopically analyzing a light beam entering between said two opposed surfaces;

seal means for separating a space including a spacing between said two opposed surfaces from its environment; and means for varying the distance between said two opposed surfaces, said varying means being disposed outside said separated space.

7. An apparatus according to claim 6 wherein said varying means includes a piezoelectric element disposed outside said spacing between said two opposed surfaces of said transparent plates.

8. An apparatus according to claim 7 wherein said seal means includes a heat insulation member.

9. An apparatus according to claim 6, wherein said opposed surfaces each include a reflection surface, and a gas is filled in said spacing to prevent deterioration of said reflection surfce.

* * * * *

UNITED STATES PATENT AND TRADEMARK OFFICE
CERTIFICATE OF CORRECTION

PATENT NO. : 4,850,709
DATED : July 25, 1989
INVENTOR(S) : MIKICHI BAN ET AL

It is certified that error appears in the above-identified patent and that said Letters Patent is hereby corrected as shown below: On the title page;

At column [54], "FABRI-PEROT" should read --FABRI-PÉROT--.

At column 1, line 1, "FABRI-PEROT" should read --FABRI-PÉROT--;

At column 1, line 27, "resolution" should read --reflection--; and

At column 1, line 41, "$T = \frac{I(t)}{I(i)}$" should read --$T = \frac{I(t)}{J(i)}$--.

At column 2, line 32, "ration" should read --ratio--.

At column 7, line 42, "angle θ'hd 1" should read --angle $\theta'_1$--.

UNITED STATES PATENT AND TRADEMARK OFFICE
CERTIFICATE OF CORRECTION

PATENT NO. : 4,850,709

DATED : July 25, 1989

INVENTOR(S) : MIKICHI BAN ET AL

It is certified that error appears in the above-identified patent and that said Letters Patent is hereby corrected as shown below:

At column 8, line 45, "are same" should read --are the same--.

At column 9, line 36, "other" should read --another --; and

At column 9, line 52, "to" should read --so--.

At claim 2, line 1, "claim 1" should read --claim 1, --.

At claim 4, line 1, "claim 3" should read --claim 3,--.

At claim 5, line 1, "claim 3" should read --claim 3,--.

At claim 7, line 1, "claim 6" should read --claim 6,--.

At claim 8, line 1, "calim 7" should read --claim 7,--.

At claim 9, line 27, "surfce." should read --surface.--.

Signed and Sealed this

Third Day of July, 1990

Attest:

HARRY F. MANBECK, JR.

*Attesting Officer*    *Commissioner of Patents and Trademarks*